(12) United States Patent
Noh (10) Patent No.: US 12,412,296 B2
(45) Date of Patent: Sep. 9, 2025

(54) APPARATUS AND METHOD FOR GAZE TRACKING BASED ON MACHINE LEARNING

(71) Applicant: EMOCOG Co., Ltd., Seoul (KR)

(72) Inventor: Yoo Hun Noh, Seoul (KR)

(73) Assignee: EMOCOG CO., LTD., Seoul (KR)

( * ) Notice: Subject to any disclaimer, the term of this patent is extended or adjusted under 35 U.S.C. 154(b) by 510 days.

(21) Appl. No.: 17/836,467

(22) Filed: Jun. 9, 2022

(65) Prior Publication Data

US 2022/0327734 A1 Oct. 13, 2022

Related U.S. Application Data

(63) Continuation of application No. PCT/KR2022/004627, filed on Apr. 4, 2022.

(30) Foreign Application Priority Data

Apr. 8, 2021 (KR) ........................ 10-2021-0045737

(51) Int. Cl.
*G06T 7/73* (2017.01)

(52) U.S. Cl.
CPC ...... *G06T 7/73* (2017.01); *G06T 2207/20081* (2013.01); *G06T 2207/30201* (2013.01)

(58) Field of Classification Search
CPC .......... G06T 7/20–251; G06T 7/70–77; G06T 2207/30041; G06T 2207/30201;
(Continued)

(56) References Cited

U.S. PATENT DOCUMENTS

| 2015/0293588 | A1* | 10/2015 | Strupczewski | G06F 3/012 |
| | | | | 382/117 |
| 2016/0063303 | A1 | 3/2016 | Cheung et al. | |
| 2021/0174062 | A1* | 6/2021 | Hayasaka | G06V 40/161 |

FOREIGN PATENT DOCUMENTS

| EP | 3893090 A1 * | 10/2021 | ............. G06F 3/012 |
| JP | 2003-271932 A | 9/2003 | |

(Continued)

OTHER PUBLICATIONS

Extended European Search Report received in EP Application No. 22784862.9 dated Jun. 27, 2024.
(Continued)

*Primary Examiner* — Gregory A Morse
*Assistant Examiner* — Stefano Anthony Dardano
(74) *Attorney, Agent, or Firm* — Knobbe, Martens, Olson, & Bear, LLP (57) ABSTRACT

A device and a method for gaze tracking based on machine learning are proposed. In one aspect, the device includes an input unit configured to input an image including a face, and a feature point detection processor configured to detect first feature points in the image including the face. The device may also include a face direction detection processor configured to detect a direction of the face based on the detected first feature points, and an eye-ball direction detection processor configured to detect an eye-ball direction, which is a feature of an eye-ball, from the detected first feature points. The device may further include a model training processor configured to train a gaze tracking model by using the detected first feature points and the eye-ball direction, and a gaze tracking processor configured to perform gaze tracking by using a trained gaze tracking model.

8 Claims, 10 Drawing Sheets

(58) Field of Classification Search
CPC .......... G06T 2207/20081; G06T 2207/20084; G06V 10/40; G06V 40/16; G06V 40/165; G06V 40/18; G06V 40/193; H04N 13/383; G06F 3/011–015

See application file for complete search history.

(56) References Cited

FOREIGN PATENT DOCUMENTS

| | | | |
|---|---|---|---|
| JP | 2003-3271932 A | | 9/2003 |
| JP | 2007-265367 A | | 10/2007 |
| JP | 2013-70342 | * | 4/2013 |
| JP | 6745518 B | | 8/2020 |
| KR | 10-1094766 B1 | | 12/2011 |
| KR | 2015-0117553 A | | 10/2015 |
| KR | 10-1706992 B1 | | 2/2017 |
| KR | 10-1819164 B1 | * | 1/2018 |
| KR | 10-2019-0040797 | * | 4/2019 |
| KR | 10-2019-0113252 A | | 10/2019 |
| WO | WO-2019155570 A1 | * | 8/2019 |
| WO | WO 2020/231401 A1 | | 11/2020 |

OTHER PUBLICATIONS

Japanese Office Action received in JP Application No. 2023-561911 dated Aug. 6, 2024.
Japanese Notice of Allowance received in JP Application No. 2023-561911 dated Feb. 4, 2025.
Korean Office Action received in KR Application No. 10-2021-0045737 dated Aug. 21, 2022.
Korean Office Action received in KR Application No. 10-2021-0045737 dated Feb. 11, 2023.
Korean Notice of Allowance received in KR Application No. 10-2021-0045737 dated Jul. 31, 2023.
International Search Report received in PCT/KR2022/004627 dated Jul. 25, 2022.

* cited by examiner

APPARATUS AND METHOD FOR GAZE TRACKING BASED ON MACHINE LEARNING

CROSS REFERENCE TO RELATED APPLICATIONS

This is a continuation application of International Application No. PCT/KR2022/004627, filed on Apr. 4, 2022, which claims the benefit of Korean Patent Applications No. 10-2021-0045737 filed on Apr. 8, 2021 in the Korean Intellectual Property Office, the entire disclosure of each of which is incorporated herein by reference.

BACKGROUND

Technical Field

The present disclosure relates to gaze tracking technology, and more specifically, to a device and method for gaze-tracking based on machine learning.

Description of Related Technology

Gaze tracking technology detects the position the user is looking at by measuring the movement of the eyeball. For the interface between the user and the computer, instead of the keyboard or the mouse, gaze tracking technology is mainly applied to pointing devices. The results output through the gaze tracking device is also being used as data to analyze the user's concentration level or to analyze the symptoms or progress patterns of diseases.

SUMMARY

One objective of the present disclosure is to provide a machine learning-based gaze tracking device that tracks gaze by using a camera module without a separate lighting device.

Another objective of the present disclosure is to provide a machine learning-based gaze tracking device that tracks the location where the user's gaze and the display intersect each other by inferring gaze coordinates based on a regression model.

The technical objectives to be achieved by the present disclosure are not limited to the technical objectives described above, and other technical objectives not described above would be clearly understood from the description provided below by those having ordinary knowledge in the technical field to which the present disclosure belongs.

According to one aspect of the present disclosure, a machine learning-based gaze tracking device is provided.

A machine learning-based gaze tracking device according to an embodiment of the present disclosure may include an input unit for inputting an image containing the face, a feature point detection unit for detecting first feature points from the image containing the face, a face direction detection unit for detecting a direction of the face based on the detected first feature points, an eye-ball direction detection unit for detecting an eye-ball direction, which is a feature of the eye ball, from the detected first feature points, and a gaze tracking unit for performing gaze tracking by using the detected feature points, face direction, and a feature value of the eye-ball direction as an input for the trained eye tracking regression model.

According to another aspect of the present disclosure, a machine learning-based gaze tracking method is provided.

A machine learning-based gaze tracking method according to an embodiment of the present disclosure may include inputting an image containing the face, detecting first feature points from the image containing the face, detecting a the direction of the face based on the detected first feature points, detecting an eye-ball direction, which is a feature of the eye ball, from the detected first feature points, and performing gaze tracking by using the detected feature points, face direction, and a feature value of the eye-ball direction as an input for the trained eye tracking regression model.

According to an embodiment of the present disclosure, a machine learning-based gaze tracking device can track gaze by using a camera module without a separate lighting device.

According to an embodiment of the present disclosure, a machine learning-based gaze tracking device may track a location where a user's gaze and a display intersect each other by inferring gaze coordinates based on a regression model.

The effects of the present disclosure are not limited to these effects, and it should be understood to include all effects that can be inferred from the disclosure described in the description or claims of the present disclosure.

DETAILED DESCRIPTION

In general, gaze tracking devices use additional equipment such as an infrared camera, a high magnification zoom lens, or a webcam to obtain a pupil central point from the image of a user's eye, and a transformation function is applied based on the obtained result to perform gaze position tracking. However, during the gaze position tracking, there is a need to wear a separate measuring device on the face, causing inconvenience to use the equipment. Also, due to the use of expensive equipment such as an infrared illuminator, the gaze tracking requires high costs. In addition, due to the complexity of the gaze tracking calculation, processing speed and eye tracking performance are degraded.

Hereinafter, the present disclosure will be described with reference to the accompanying drawings. However, the present disclosure may be implemented in several different forms, and thus is not limited to the embodiments described herein. To clearly explain the present disclosure in the drawings, parts irrelevant to the description are omitted, and similar reference numerals are used to denote similar parts throughout the specification.

Throughout the specification, when a part is said to be "connected (contacted, coupled)" with another part, this expression includes not only "directly connected" but also "indirectly connected" with another part interposed therebetween. In addition, when a part "includes" a certain part, this expression includes a case where other parts may be further provided without excluding other parts unless stated otherwise.

The terminology used herein is used only to describe specific embodiments, and is not intended to limit the present disclosure. The singular expression includes the plural expression unless the context clearly indicates otherwise. The terms such as "comprise" or "include" are intended to designate that a feature, number, process, operation, component, part, or a combination thereof described in the specification exists, and a case where one or more other features, numbers, processes, operations, components, parts, or a combination thereof exist or are added, is not excluded in advance.

FIGS. 1 to 8 are diagrams for explaining a machine learning-based gaze tracking device according to an embodiment of the present disclosure.

Figure 1:
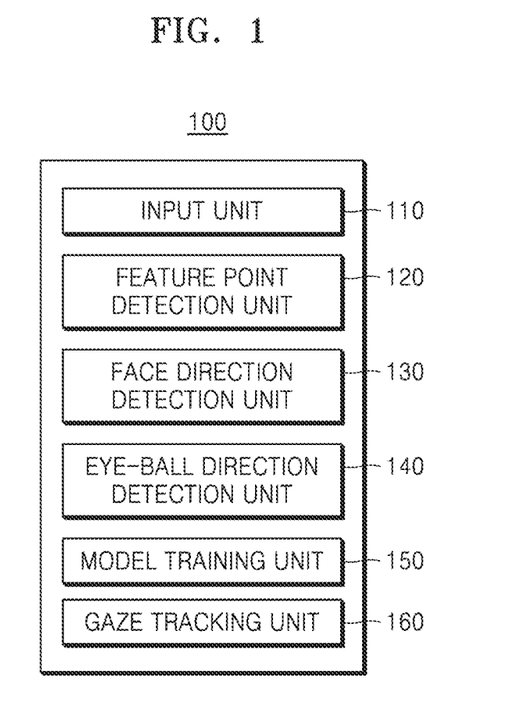
FIGS. 1-4, 5A-5D, and 6-8 are diagrams for explaining a machine learning-based gaze tracking device according to an embodiment of the present disclosure.

Referring to FIG. 1, a machine learning-based gaze tracking device 100 includes an input unit 110, a feature point detection unit (or a feature point detection processor) 120, a face direction detection unit (a face direction detection processor) 130, an eye-ball direction detection unit (an eye-ball direction detection processor) 140, a model training unit (a model training processor) 150, and a gaze tracking unit (a gaze tracking processor) 160.

The input unit 110 may input an image including a face. For example, the input unit 110 inputs an image including a face obtained through a web camera or an RGB camera.

The feature point detection unit 120 detects first feature points from the image including the face. Herein, the first feature points may be detected as coordinates in a three-dimensional space by using a machine learning model.

The face direction detection unit 130 detects the direction of the face based on the detected feature points. In an embodiment, the face direction detection unit 130 extracts, from the detected first feature points, second feature points whose position do not change even when facial expression changes or movement occurs.

Figure 2:
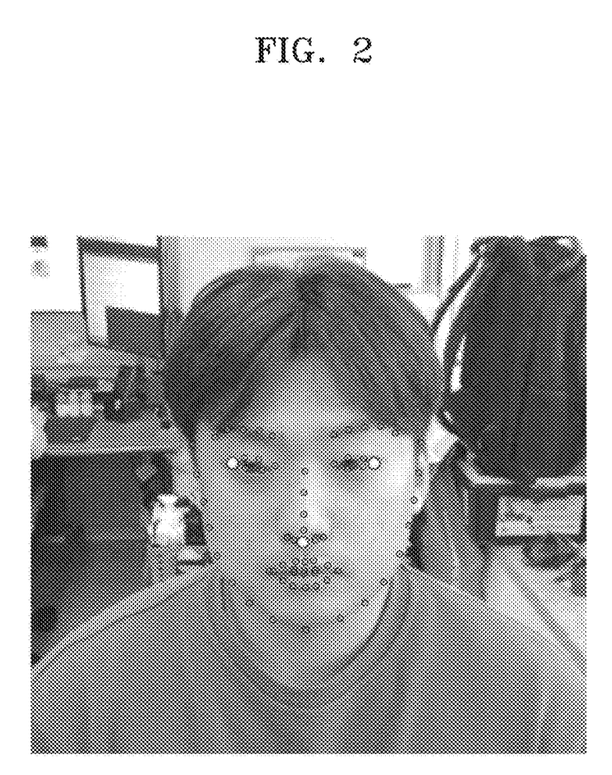

For example, as shown in FIG. 2, the face direction detection unit 130 may extract, from the first feature points detected in the image of the face, the outer corners of the eyes and the philtrum starting point, as the second feature points.

The face direction detection unit 130 detects a plane with respect to the position and direction of the face based on the extracted second feature points. Herein, the face direction detection unit 130 may calculate a normal vector perpendicular to the plane for the position and direction of the detected face.

The face direction detection unit 130 may detect a 3-dimensional vector for the direction of the face based on the calculated normal vector.

The eye-ball direction detection unit 140 may detect the direction of the eye ball by extracting, from the first feature points detected by the feature point detection unit 120, third feature points, which is a feature point of the eye-ball. The eye-ball direction detection unit 140 may include a rotational center calculation unit 141, an iris center calculation unit 143, and a center connection unit 145.

The feature point detection unit 120, the face direction detection unit 130, the eye-ball direction detection unit 140, the model training unit 150, and the gaze tracking unit 160 may be implemented by at least one processor. The processor may control the operation of the gaze tracking device 100 by executing programs stored in the memory in the gaze tracking device 100.

Figure 3:
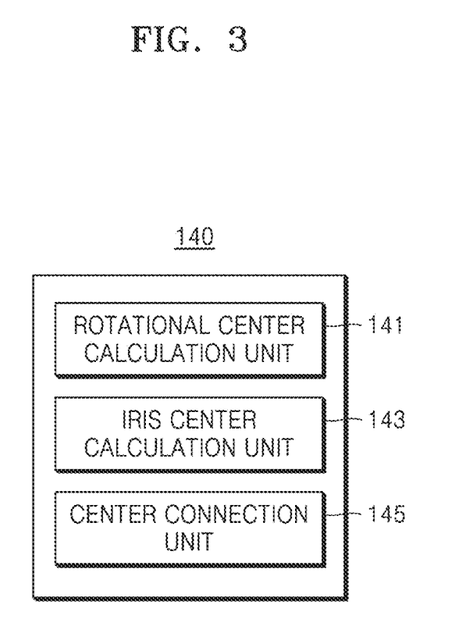
Figure 4:
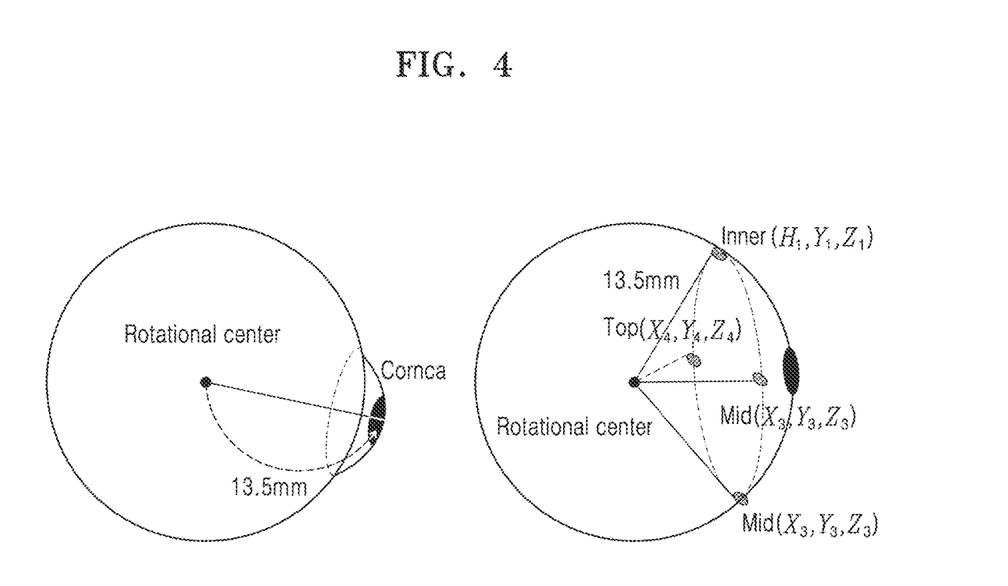

Referring to FIG. 3, the rotational center calculation unit 141 may extract, from the first feature points detected by the feature point detection unit 120, the third feature points, which is a feature point of the eye-ball, and may use the third feature points to calculate the rotational center of the eye-ball. For example, the rotational center calculation unit 141 may calculate the rotational center of the eye-ball by using extracted four third feature points (Inner, Mid, Top, Outer) as shown in FIG. 4.

The iris center calculation unit 143 may calculate the center of the iris based on the inclination in the eye region of the image of the face. For example, the iris center calculation unit 143 may detect the central point of the iris and the iris center coordinates based on the inclination in the eye region of the image of the face. Specifically, the iris center calculation unit 143 may use template matching to detect an iris central point through a pixel inclination at an iris boundary in an eye region. According to template matching, an average template of the region to be found is built, and the correlation between the template and an input image is used to find a matching position. According to the present disclosure, through the correlation between a template filter and the pixel inclination in the eye region, the pixel position having the highest value in the eye region is detected as the central point of the iris and expressed as coordinates.

In another embodiment, the iris center calculation unit 143 may detect the iris central point and the iris central coordinates by using a deep learning algorithm such as Fast RCNN.

Figure 5A:
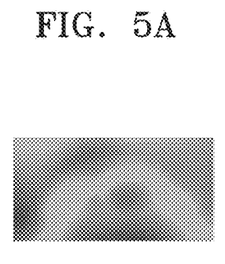
Figure 5B:
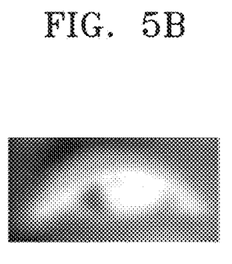
Figure 5C:
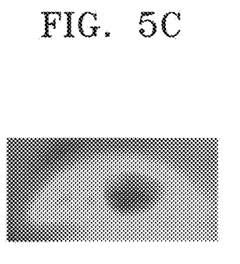
Figure 5D:
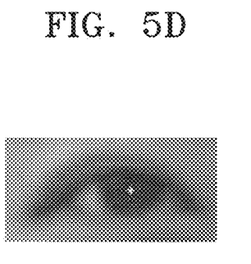

Referring to FIGS. 5A-5D, the iris center calculation unit 143 may extract the pixel position having the highest value in the eye region through the correlation between the template filter and the pixel inclination in the eye region (FIG. 5A). Herein, the iris center calculation unit 143 may perform filtering using an image of which pixel values are inverted, in order to filter the region under the iris, which has a high value due to the curve of the eyelid (FIG. 5B). The iris center calculation unit 143 may detect the position having the highest pixel value as the iris central point by reflecting the filtering result (FIGS. 5C and 5D).

Figure 6:
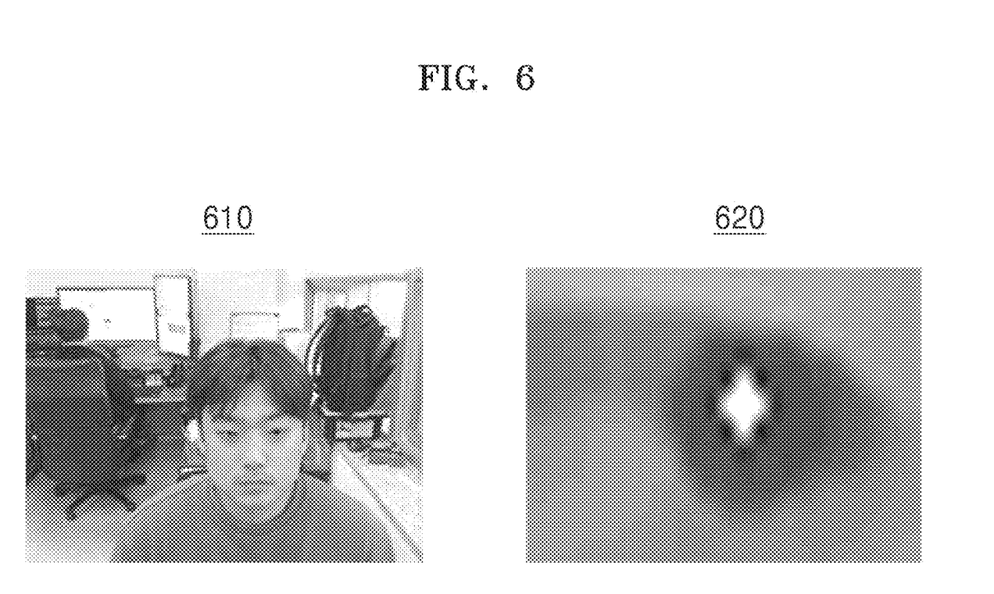

Referring to FIG. 6, the iris center calculation unit 143 may detect the iris central point from the RGB image of the face (610), and after extracting the eye region from the image of the face, perform inclination-based iris central point detection to detect the central point (620).

Referring back to FIG. 3, the center connection unit 145 detects a three-dimensional vector with respect to the eye-ball direction by connecting the rotational center coordinates of the eye-ball and the iris center coordinates.

The rotational center calculation unit 141, the iris center calculation unit 143, and the center connection unit 145 may be implemented by at least one processor.

Figure 7:
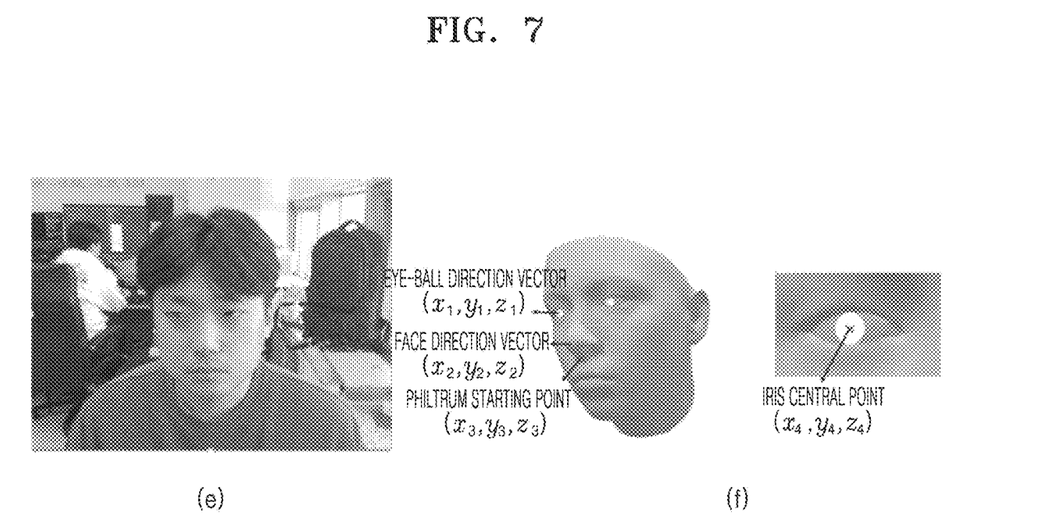

Referring to FIG. 7, the model training unit 150 trains a gaze tracking model by using the previously detected gaze feature values as an input. The model training unit 150 trains the gaze tracking model by using the philtrum starting point and face direction vector detected by the face direction detection unit 130, the iris central point detected by the iris center calculation unit 143, and the eye-ball direction vector detected by the center connection unit 145, as an input (e). In detail, the model training unit 150 trains the gaze tracking model by using, as an input, an eye-ball direction vector (x1, y1, z1), a face direction vector (x2, y2, z2), a philtrum starting point (x3, y3, z3), and an iris central point (x4, y4, z4) (f).

Figure 8:
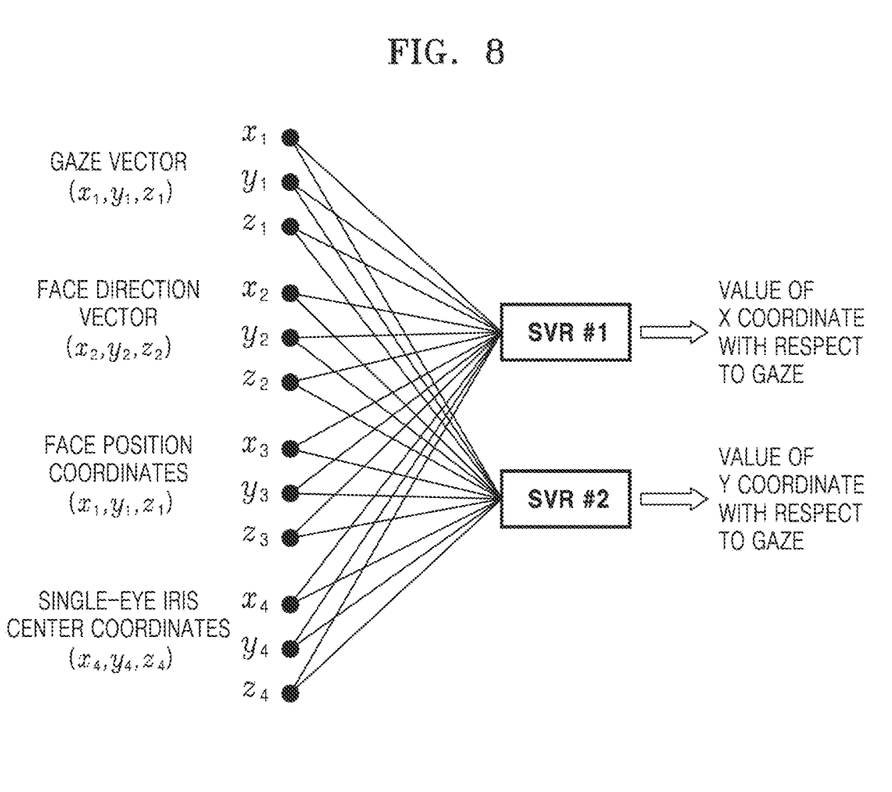

The model training unit 150 may train a support vector regression (SVR) as a gaze tracking model as shown in FIG. 8. Support vector regression (SVR), which is a gaze tracking regression model, is a machine learning-based model that is extended from support vector machine (SVM) so as to be used for regression analysis. SVR performs gaze tracking by using a regression function. The model training unit 150 may train a first support vector regression (SVR #1) and a second support vector regression (SVR #2).

In another embodiment, the model training unit 150 may use a regression model capable of deriving x and y values at once.

Figure 9:
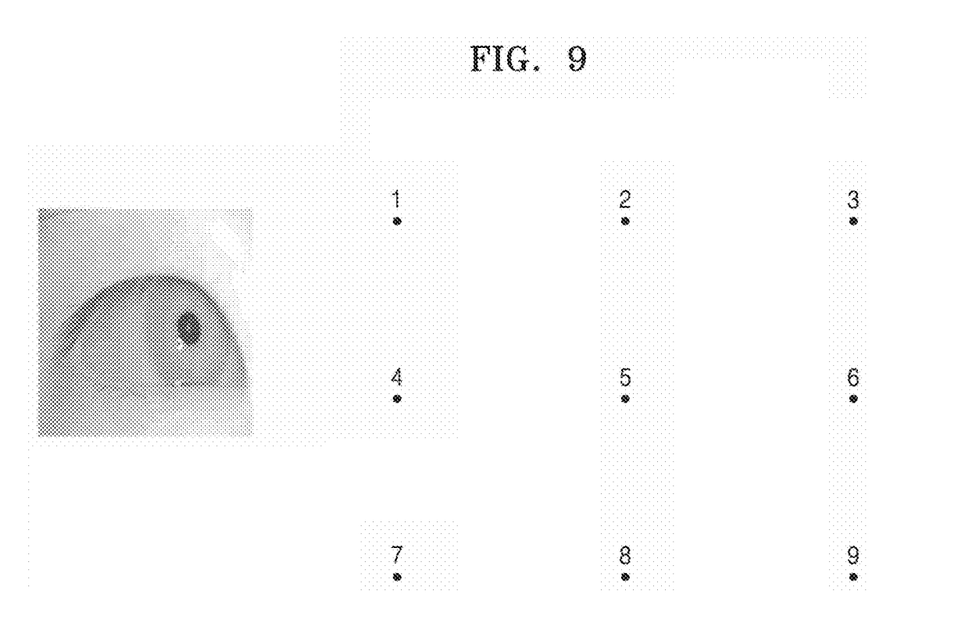
FIG. 9 shows 9 calibration points to which the gaze is directed.

Herein, the model training unit 150 may train support vector regression by using the gaze feature value detected through the calibration process as an input. That is, the model training unit 150 may train the x-coordinate and y-coordinate of the position of gaze to be displayed on a display by using the philtrum starting point, the face direction vector, the iris central point, and the eye-ball direction vector which are detected when the gaze is directed to the 9 calibration points as shown in FIG. 9.

The model training unit 150 may learn the x-coordinate and y-coordinate, which are the position of the gaze, by using Equation 1 below.

$$f(x) = W^T x + b \quad \text{[Equation 1]}$$
$$x = \begin{pmatrix} x_1 & x_2 & x_3 & x_4 \\ y_1 & y_2 & y_3 & x_4 \\ z_1 & z_2 & z_3 & x_4 \end{pmatrix}, \quad y = (x, y)$$

Herein, x represents a matrix of a total of 12 feature values of x, y, and z coordinates of the philtrum starting point, the face direction vector, the iris central point, and the eye-ball direction vector which are to be input, and y represents coordinates on the display according to the input. $W^T$ denotes a regression model parameter that converts an input value into gaze coordinates, and Equation 2 below is used to obtain a regression model parameter that minimizes loss.

$$\min \frac{1}{2}\|w\|^2 + C\sum_{i=1}^{n}(\xi_i + \xi_i^*) \quad \text{[Equation 2]}$$
$$\text{s.t. } (w^T x_i + b) - y_i \leq \epsilon + \xi_i$$
$$y_i - (w^T x_i + b) \leq \epsilon + \xi_i^*$$
$$\xi_i \xi_i^* \geq 0$$

The gaze tracking unit 160 may perform gaze tracking by using the model trained by the model training unit 150. The gaze tracking unit 160 uses the trained regression model so as to address the degrees of freedom that may arise during a projection transformation process that calculates gaze coordinates on the monitor plane in two-dimensional space by using the user's face and eye movements in the 3-dimensional space, thereby performing semi-permanent gaze tracking.

Figure 10:
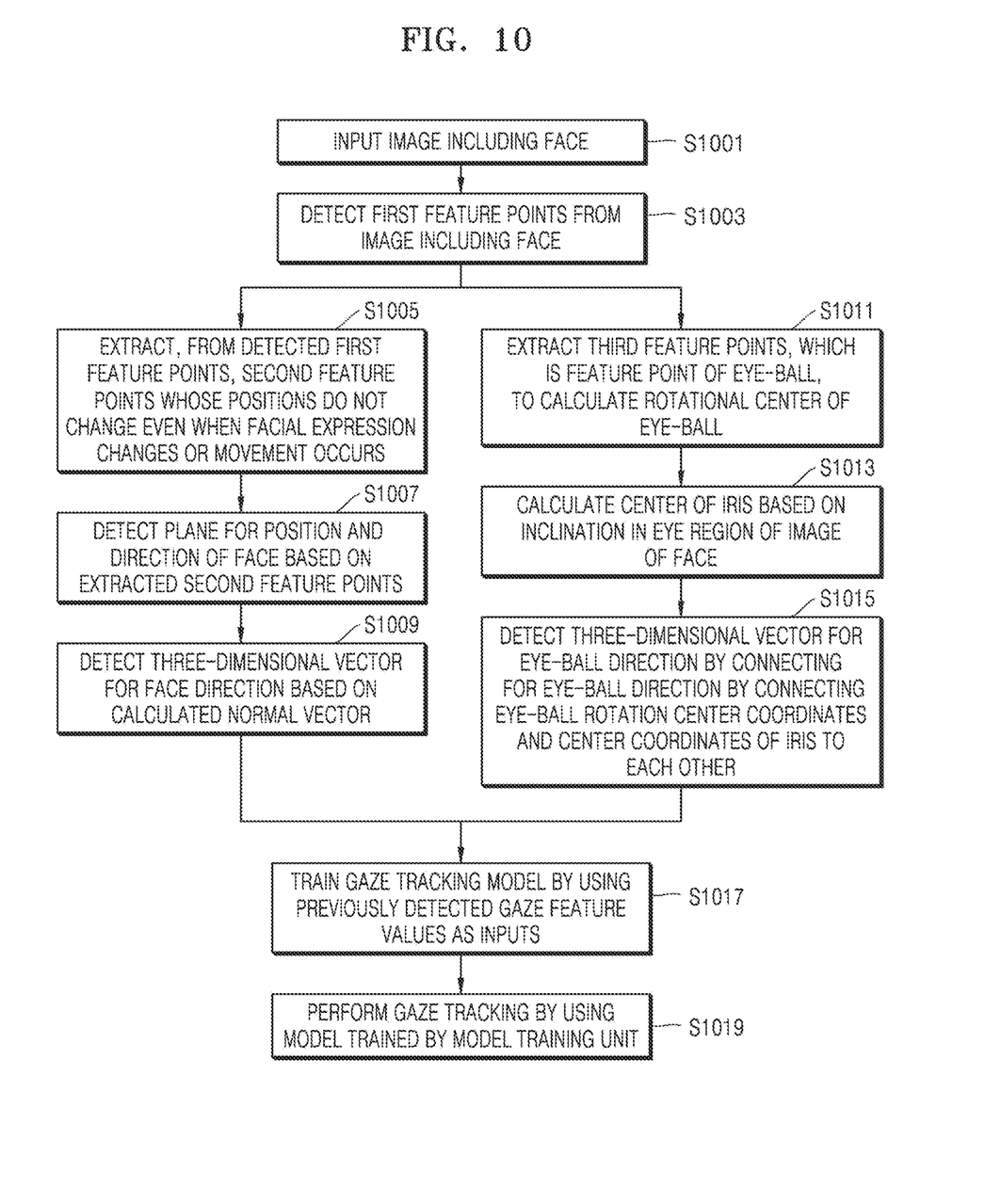
FIG. 10 is a diagram for explaining a machine learning-based gaze tracking method according to an embodiment of the present disclosure.

FIG. 10 is a diagram for explaining a machine learning-based gaze tracking method according to an embodiment of the present disclosure.

Referring to FIG. 10, in operation S1001, the machine learning-based gaze tracking apparatus 100 inputs an image including a face. For example, the machine learning-based gaze tracking device 100 may input an image including a face obtained through a web camera or an RGB camera.

In operation S1003, the machine learning-based gaze tracking device 100 detects first feature points from the image including the face. Here, the first feature points may be detected as coordinates in a three-dimensional space by using a machine learning model.

In operation S1005, the machine learning-based gaze tracking device 100 extracts, from the detected first feature points, second feature points whose positions do not change even when facial expression changes or movement occurs. For example, the machine learning-based gaze tracking device 100 may extract, from the first feature points detected in the image of the face, the outer corners of the eyes and the philtrum starting point, as the second feature points.

In operation S1007, the machine learning-based gaze tracking device 100 may detect a plane for the position and direction of the face based on the extracted second feature points. Here, the machine learning-based gaze tracking device 100 may calculate a normal vector perpendicular to the plane for the position and direction of the detected face.

In operation S1009, the machine learning-based gaze tracking device 100 may detect a three-dimensional vector for the direction of the face based on the calculated normal vector.

In operation S1011, the machine learning-based gaze tracking device 100 may extract from the first feature points detected by the feature point detection unit 120, the third feature points, which is a feature point of the eye-ball, and may use the third feature points to calculate the rotational center of the eye-ball. For example, the machine learning-based gaze tracking device 100 may calculate the rotational center of the eye-ball by using extracted four third feature points (Inner, Mid, Top, Outer) as shown in FIG. 4.

In operation S1013, the machine learning-based gaze tracking device 100 may calculate the center of the iris based on the inclination in the eye region of the image of the face. Specifically, the machine learning-based gaze tracking device 100 may extract the position of the pixel having the highest value in the eye region through the correlation between the template filter and the pixel inclination in the eye region. Herein, the machine learning-based gaze tracking device 100 may perform filtering using an image of which pixel values are inverted, in order to filter the region under the iris, which has a high value due to the curve of the eyelid. The machine learning-based gaze tracking device 100 may detect the position having the highest pixel value as the iris central point by reflecting the filtering result.

In operation S1015, the machine learning-based gaze tracking device 100 detects a three-dimensional vector for the eye-ball direction by connecting the eye-ball rotational center coordinates and the center coordinates of the iris to each other.

In operation S1017, the machine learning-based gaze tracking device 100 may train the gaze tracking model by using the previously detected gaze feature values as an input. In detail, the model training unit 150 may train the gaze tracking model by using, as an input, an eye-ball direction vector (x1, y1, z1), a face direction vector (x2, y2, z2), a philtrum starting point (x3, y3, z3), and an iris central point (x4, y4, z4) (f).

The machine learning-based gaze tracking device 100 may train support vector regression (SVR) as a gaze tracking model. SVR, which is a gaze tracking regression model, is a machine learning-based model that is extended from support vector machine (SVM) so as to be used for regression analysis. SVR performs gaze tracking by using a regression function. The machine learning-based gaze tracking device 100 may train a first support vector regression (SVR #1) and a second support vector regression (SVR #2).

Here, the machine learning-based gaze tracking device 100 may train support vector regression by using the gaze feature value detected through the calibration process as an input. That is, the machine learning-based gaze tracking device 100 may learn the x-coordinate and y-coordinate of the position of gaze to be displayed on a display by using the philtrum starting point, the face direction vector, the iris central point, and the eye-ball direction vector which are detected when the gaze is directed to the 9 calibration points as shown in FIG. 10.

In operation S1019, the machine learning-based gaze tracking device 100 performs gaze tracking by using the model trained by the model training unit 150. The machine learning-based gaze tracking device 100 uses the trained regression model so as to address the degrees of freedom that may arise during a projection transformation process that calculates gaze coordinates on the monitor plane in two-dimensional space by using the user's face and eye movements in the 3-dimensional space, thereby performing semi-permanent gaze tracking.

The processor may be embodied by using at least one of electric units for performing application specific integrated circuits (ASICs), digital signal processors (DSPs), digital signal processing devices (DSPDs), programmable logic devices (PLDs), field programmable gate arrays (FPGAs), controllers, micro-controllers, microprocessors, and other functions.

The memory may include: a random access memory (RAM), such as dynamic random access memory (DRAM), static random access memory (SRAM), or the like; or read-only memory (ROM), electrically erasable programmable read-only memory (EEPROM), CD-ROM, blue ray or other optical disk storage, a hard disk drive (HDD), a solid state drive (SSD), or a flash memory.

The description of the present disclosure provided above is for illustration only, and it would be understood that those having ordinary knowledge in the technical field to which the present disclosure belongs could easily transform the same into other specific forms without changing the technical concept or essential characteristics of the present disclosure. Therefore, it should be understood that the embodiments described above are examples in all respects and not restricted. For example, each component described as being a single type may be implemented in a dispersed form, and likewise, components described as being distributed may also be implemented in a combined form.

The scope of the present disclosure is indicated by the following claims, and all changes or modifications derived from the meaning and scope of the claims and their equivalent concepts should be construed as being included in the scope of the present disclosure.

What is claimed is:

1. A machine learning-based gaze tracking device comprising:
    an input processor configured to receive an image including a face;
    a feature point detection processor configured to detect first feature points in the image including the face;
    a face direction detection processor configured to detect a direction of the face based on second feature points by extracting, from the first feature points, outer corners of eyes and a philtrum starting point, whose positions do not change even when facial expression changes or movement occurs, as the second feature points;
    an eye-ball direction detection processor configured to detect an eye-ball direction, which is a feature of an eye-ball, from the detected first feature points;
    a model training processor configured to train a gaze tracking model by using the detected first feature points, the direction of the face, and the eye-ball direction; and
    a gaze tracking processor configured to perform gaze tracking by using the trained gaze tracking model.

2. The machine learning-based gaze tracking device of claim 1, wherein the eye-ball direction detection processor includes:
    a rotational center calculation processor configured to extract, from the first feature points detected by the feature point detection processor, third feature points of the eye-ball, and use the third feature points to calculate a rotational center of the eye-ball;
    an iris center calculation processor configured to calculate a center of an iris in an eye region of the image of the face; and
    a center connection processor configured to detect a three-dimensional vector for the eye-ball direction by connecting the rotational center of the eye-ball and the center of the iris.

3. The machine learning-based gaze tracking device of claim 2, wherein the iris center calculation processor is configured to detect an iris central point and center coordinates of the iris based on an inclination in the eye region.

4. A machine learning-based gaze tracking method comprising:
    receiving, at an input processor, an image including a face;
    detecting, at a feature point detection processor, first feature points in the image including the face;
    detecting, at a face direction detection processor, a direction of the face based on detected first feature points;
    detecting, at an eye-ball direction detection processor, an eye-ball direction, which is a feature of an eye-ball, from the detected first feature points; and
    performing, at a gaze tracking processor, gaze tracking by using the detected first feature points, the direction of the face, and the detected eye-ball direction as an input to a trained gaze tracking regression model,
    wherein detecting the direction of the face comprises:
        extracting, from the first feature points, outer corners of eyes and a philtrum starting point, whose positions do not change even when facial expression changes or movement occurs, as second feature points, and detecting the direction of the face based on the second feature points.

5. The machine learning-based gaze tracking method of claim 4, wherein detecting the eye-ball direction comprises:
    extracting, from the detected first feature points, third feature points of the eye-ball detected by the feature point detection processor, and calculating a rotational center of the eye-ball by using the third feature points;
    calculating a center of an iris in an eye region of the image of the face; and
    detecting a three-dimensional vector for the eye-ball direction by connecting the rotational center of the eye-ball and the center of the iris to each other.

6. The machine learning-based gaze tracking method of claim 5, wherein calculating the center of the iris comprises:
    detecting an iris central point and center coordinates of the iris based on an inclination in the eye region.

7. A non-transitory computer readable medium storing instructions, when executed by one or more processors, causing the one or more processors to perform the machine learning-based gaze tracking method of claim 4.

8. The machine learning-based gaze tracking device of claim 1, wherein two or more of the input processor, the feature point detection processor, the face direction detection processor, the eye-ball direction detection processor, the model training processor, or the gaze tracking processor are configured to be implemented as a single processor.

\* \* \* \* \*